Dec. 31, 1963   J. W. HENDRY   3,115,681
FLUTED RAM AND FLUTED EXTRUDER
Filed June 28, 1961
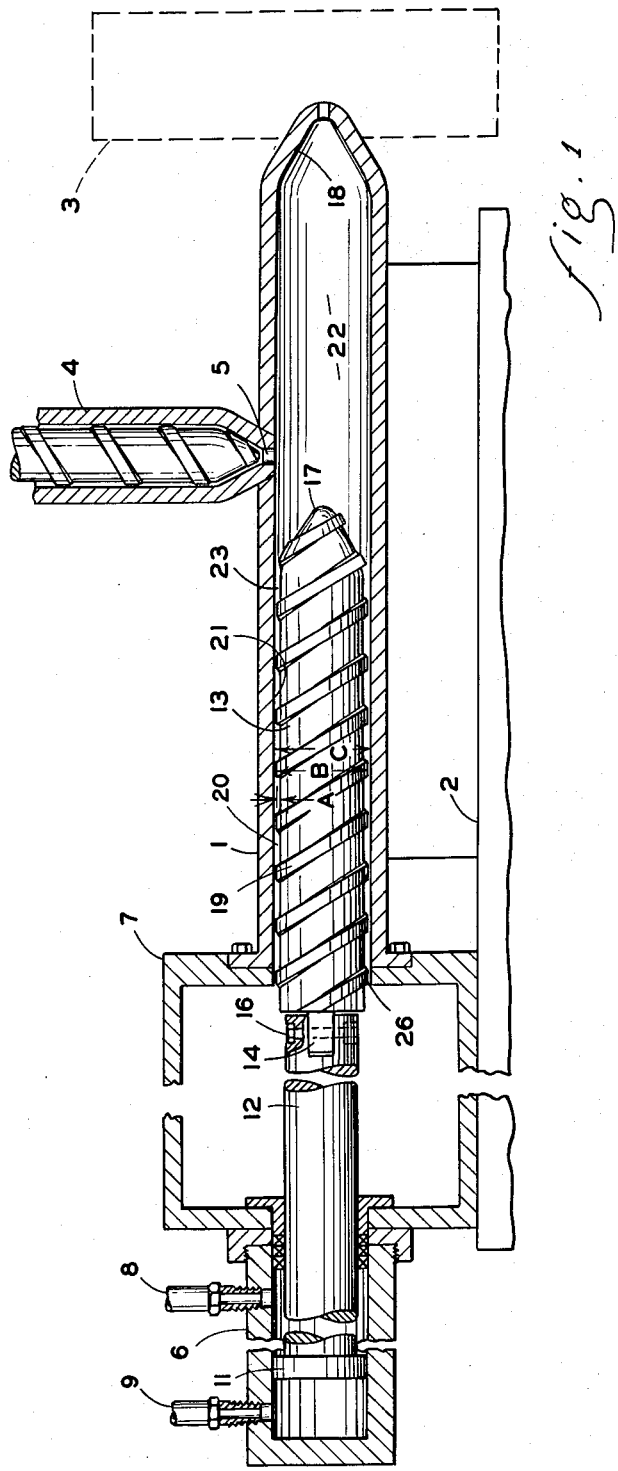
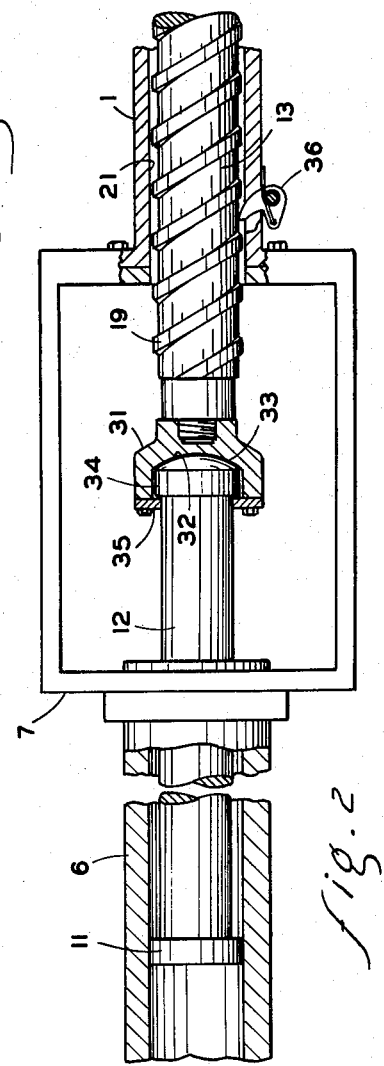
INVENTOR.
JAMES W. HENDRY
BY
Woodhams Blanchard and Flynn
ATTORNEYS

United States Patent Office 3,115,681
Patented Dec. 31, 1963

3,115,681
FLUTED RAM AND FLUTED EXTRUDER
James W. Hendry, Scottsburg, Ind., assignor to Borg-Warner Corporation, Chicago, Ill., a corporation of Illinois
Filed June 28, 1961, Ser. No. 120,269
6 Claims. (Cl. 18—30)

This invention relates to a ram for an injection molding machine and particularly to a type thereof which utilizes the injection pressure for rotating the ram and thereby rendering it self-cleaning.

In the injection molding of the majority of presently utilized plastic materials, it is recognized that a certain amount of such material works back between the opposing surfaces of the ram and the injection chamber and the presence of such material is in many instances relied upon to effect lubrication of said ram and prevent the metal surfaces from contacting and thereby scoring each other. With most presently used plastic materials, this presents no difficulty inasmuch as the materials are not normally subject to degradation even under the prolonged exposure to heat which they experience between the ram and surrounding cylinder. However, when the machine is operating on a plastic material which is more readily subject to degradation upon either exposure to excessive heat or exposure to normal molding temperature for an excessive period of time, then plastic material which works back between the ram and the surrounding wall of the injection cylinder becomes degraded. Often the degraded material, by this time usually black in color, may then work back into the plastic mass being molded and become entrained therein, resulting in an unattractive discoloration, or at least flecking, of the molded parts.

Previous attempts to solve this problem have relied upon the provision of a relatively wide space between the injection ram and the adjacent cylinder walls in order to insure the constant movement of sufficient plastic material outwardly from the injection cylinder for the purpose of preventing such degraded material from returning into the body of material being molded. However, this is not only difficult to control and wasteful of both plastic material and power, but it still does not work particularly successfully inasmuch as material which is squeezed into the space between the ram and surrounding walls of the injection chamber and partially degraded therein may still be returned into the mass to be molded upon subsequent actuated of the ram.

Therefore, the objects of the invention are:

(1) To provide apparatus for insuring the presence of sufficient plastic material in the zone between a reciprocating ram and the walls of a surrounding cylinder to effect lubrication therebetween but preventing the return of degraded plastic material from such zone into the mass of plastic material being molded.

(2) To provide such apparatus wherein the injection ram, or at least portions thereof, fits snugly against the surrounding cylinder walls.

(3) To provide apparatus, as aforesaid, which will require only a minimum of such plastic material for such lubricating purposes.

(4) To provide apparatus, as aforesaid, which will insure that any plastic material entering into the zone between the ram and the surrounding cylinder walls will continue to move away from the mass of plastic material being injected and will be eventually discharged from said injection cylinder.

(5) To provide apparatus, as aforesaid, which will in no way interfere with the injecting function of the injection ram.

(6) To provide apparatus, as aforesaid, which will be of extreme simplicity so as not to add appreciably either to the original cost of the equipment or to its operating or maintenance cost.

(7) To provide apparatus, as aforesaid, which will be fully reliable in operation.

Other objects and purposes of the invention will become apparent to persons acquainted with devices of this general type upon reading the following specification and an inspection of the accompanying drawings.

In the drawings:

FIGURE 1 shows in central, longitudinal section a view of a typical plastic injection machine fitted with the apparatus of the invention.

FIGURE 2 shows a fragment of a modification.

General Descritption

In general, the invention consists of providing the injection ram with a spiral screw thread thereon and arranging said ram on the parts connected thereto in such a manner that such ram is free to rotate only in response to forward movement thereof in the injection cylinder, particularly, in response to back pressure exerted thereon by the material being injected into the mold. Said rotation may be effected either by permitting the entire structure associated with said ram including the piston within the injection cylinder to rotate or a suitable rotation permitting coupling may be provided between the plunger of the injection cylinder and the injection ram. The back pressure of plastic material being injected will act against the spiral thread on said ram causing same to rotate through at least a few degrees of rotation with each injection stroke and said rotation will act through said threads to cause plastic material previously present between the ram and the surrounding cylinder walls to move backwardly to a point of discharge.

Detailed Description

In connection with the detailed description of typical apparatus embodying the invention, certain terminology will be used for convenience in reference but which will be understood as for descriptive purposes only and not limiting.

The terms "rightward" and "leftward" will refer to rightward and leftward directions in the accompanying drawing. The terms "forward" and "rearward" will refer respectively to the discharge end of the injection cylinder and the pressure-fluid-cylinder end of the injection cylinder. Said terms will also include derivatives of the words above specifically mentioned as well as words of similar import.

Turning now to the drawing in more detail, there is shown for illustrative purposes a typical injection cylinder 1 mounted in any suitable manner on a convenient base 2 and operatively connected with a mold indicated schematically at 3. Any convenient means are provided for introducing plasticized material into the interior of said injection cylinder, such means being for example a screw-type preplasticizing unit 4 of the type shown in more detail in the patent to Goldhard No. 2,505,540 or, means as shown in my copending application Serial No. 120,268, wherein such preplasticized material is introduced through the entrance port 5. A pressure fluid cylinder 6 is fastened in any convenient manner, such as by connecting structure 7, rigidly to the injection cylinder 1 and said cylinder 6 is supplied with pressure fluid at one or the other end thereof through the conduits 8 and 9. Said pressure fluid cylinder 6 contains a conventional piston 11 reciprocably mounted therein and rigidly affixed to the usual rod 12.

All of the foregoing is conventional and of itself forms no part of the present invention and is set forth solely for illustrative purposes. Accordingly, it will be recognized that same may be varied widely within the scope of the invention and the selection of the particular apparatus so illustrated will be recognized for illustrative purposes only and not limiting.

Turning now to the injection ram structure, there is provided a ram 13 affixed rigidly at 14 to the piston rod 12 in any conventional manner, such as by means including bolt 16 and in this embodiment having a tapered nose portion 17 to fit the correspondingly internally tapered end 18 of the injection cylinder. A plurality of spiral threads 19 are provided on said injection ram, preferably extending the full length thereof. Said threads are, however, of very small radial extent, a typical dimension for the extent of said threads beyond the root diameter thereof, and indicated by the dimension A in the drawing, being approximately 0.005 inch for a ram of 46 inches in length and 3 inches in diameter exclusive of said threads. The diameter of the arm including the threads provides a close sliding fit with the wall 21 defining the injection chamber. In the specific illustrated embodiment, the diameter "B" is 3.062 inches and the diameter "C" is 3.068. The pitch of the threads may vary widely. In the illustrated embodiment, there is shown a double thread having a 2 inch pitch, and discharged to any suitable receptacle or other means as convenient.

Alternatively, the structure may be thought of as a ram of diameter indicated at "B" above and having a shallow spiral groove 20 of depth "A" extending from one end thereof to the other. For reference purposes, the entrance to said groove located adjacent the curved tip 17 may be termed the "entrance" thereof and the portion of said groove adjacent the leftward end of said ram may be termed the "discharge" thereof. The length of the threaded portion of the arm is preferably greater than the distance between the discharge port of the injection cylinder and the point of introduction thereinto of the plasticized plastic material. Thus, when the ram is in its fully extended position, the entire distance from such point of introduction to the discharge port will be spanned by the threaded zone of the ram.

Rod 12 is preferably made of smaller diameter than the diameter of the ram to permit easy escape of plastic material which may be discharged from the leftward end of the threaded portion of the ram when same is in its extended (rightward) or partially extended position. Thus, any such material which reaches the leftward end of the threaded portion of the ram will upon retraction thereof be immediately and positively removed from the injection cylinder. As will become more clear as the description proceeds, the specific depth and pitch of these threads will be such, having in mind the viscosity of the plastic material being handled and the resistance existing in the mechanism to rotation of said ram within said casing, that as the ram is driven against the plastic material with the pressure necessary to effect suitable ejection of the plastic material from said injection chamber into a mold, said plastic material will exert a back pressure against said threads to effect a slight rotation of said ram. It will be apparent that if the pitch of said threads is too small, said ram will not rotate at all and it will be equally apparent that if the pitch and/or height of said threads is too great, then said ram will rotate excessively as it is urged against the plastic material. The dimensions above given illustrate one satisfactory embodiment for use with materials of relatively high viscosity such as unplasticized polyvinyl chloride or such as poly-oxy-methylene and acrylonitrile, butadiene and styrene copolymers.

It should be emphasized that in the embodiment of the invention shown in FIGURE 1, which is the preferred embodiment, there is provided no positive means whatever for effecting rotation of the ram and that such rotation is accomplished solely by the reaction thereupon of plastic material when said ram is placed under pressure against such plastic material. Further, even in the form of the invention shown in FIGURE 2 and hereinafter described, where the rotation created by the reaction pressure of the plastic material upon the ram is assisted by mechanical means, there is still provided no positive rotation of the ram as such and the rotation is brought about solely as the result and consequence of its forward movement to effect an injection operation.

Operation

The operation of the apparatus as a whole is conventional in that the pressure cylinder 6 retracts the injection ram 13 to the position shown in the drawing whereupon the plasticizing means 4 injects into the rightward end 22 of the injection cylinder a measured quantity of plastic material which has been plasticized and is ready for molding. When said chamber is filled, the preplasticizing device 4 stops and the pressure cylinder 6 is actuated to move the injection ram 13 rightwardly. Said ram thus injects plastic material into the mold 3 in the usual manner.

However, as the ram is urged rightwardly and builds pressure within the mass of plastic material located in the zone 22 of the injection cylinder, said pressure pushes plastic material into the space 23 between the main body of the injection ram and the surrounding wall 21. As such plastic material is forced into said space 23, it acts against the spiral threads 19 and imposes a rotating motion onto said injection ram. The cross section of the injection ram being circular, and the piston 11 within the pressure fluid cylinder 6 also being circular, said ram is capable of rotating and accordingly reacts to the pressure on its threads by effecting a slight rotation simultaneously with each injection stroke. As said ram continues to rotate with each injection stroke, the plastic material which previous to any given stroke was urged into said space 23 is by said given stroke moved leftwardly. Thus, said threads 19 are both driven and driving threads in a sense that the two or three rightwardmost of said threads receive pressure from the plastic material within the injection zone 22 and react thereto to effect a rotation of said ram, while the remaining ones of such threads act on the plastic material located therebetween and drive said plastic material rearwardly. Thus, with each stroke of the injection ram, a small quantity of plastic material is moved into the space 23 between the ram body and the surrounding wall 21 and the plastic material already within said space is moved rearwardly a small distance. In a typical application, the ram rotates approximately 5 degrees with each stroke and the plastic material held between the threads thereof moves rearwardly a proportionate difference. Thus, there is no possibility that any appreciable amount of plastic material which has once entered into the space 23 can ever be returned to the injection zone 22 and accordingly the material which is driven into the mold is protected from contamination by any degraded material within the space 23. Instead, such material is positively urged rearwardly by the threads 19 and is eventually ejected out from the injection cylinder at the rearward end 26 thereof.

It will be recognized that only a small amount of such plastic material is needed within the space 23 to effectively lubricate the injection ram with respect to the injection cylinder wall 21 and hence the relatively shallow space between the root diameter and the wall 21 is ample for the purposes required. Such space may be deeper or may be even shallower than the 0.005 inch above mentioned according to the viscosity of the plastic material being handled in a given case and according to the amount of plastic material which needs to be conducted rearwardly past said ram to provide the desired lubrication.

The presence of plastic material in contact with the cylinder wall 21 in the zones between the several threads 19, is sufficient to provide proper lubrication for the entirety of said ram. The spreading of such plastic is assisted by the partial rotation of the ram with each injection stroke. Further, the likelihood of the walls of the cylinder being scored by the ram is diminished by the rotation of the ram and such rotation helps to hold the ram centered.

*Modification*

In the foregoing example it was assumed that the rod 12 and piston 11 would rotate satisfactorily within the structure supporting same. In some installations this may not be feasible. In such case, there may be placed some type of rotation permitting means between the rod 12 and the injection ram 13. One such means is illustrated in FIGURE 2 wherein an injection ram 13 is connected to a pressure fluid cylinder rod 12 by suitable rotation permitting means 31. In the specific embodiment here illustrated, said rotation permitting means 31 constitutes a pair of thrust surfaces 32 and 33. A shoulder 34 on the plunger 12 cooperates with a flange 35 suitably attached to the means 31 to retract the injection ram 13. Anti-friction means, not shown, may be placed between the thrust surfaces 32 and 33 if desired.

Thus, even though the plunger 12 and parts associated fixedly therewith are for any reason held against rotation, or if the load thereon prevents the proper rotation thereof, the injection plunger 13 is still permitted to rotate with respect to the injection cylinder 1. If desired, a rotation assisting device 36, such as a spring latch, may be provided for actuation when the ram is advancing to engage the threads 19 on said ram as same moves forwardly and thereby assist rotation of said ram in response to its forward or injecting movement. This will be useful in certain instances where it is desirable to work plastic material back through and past the ram at a more rapid rate than is possible when the ram is rotated solely by the reaction force of the plastic material on the forward threads thereof. Upon retraction of said ram, the latch is ineffective.

Although particular preferred embodiments of the invention have been disclosed in detail hereinabove for illustrative purposes, it will be understood that variations and modifications of such disclosure, which lie within the scope of the appended claims, are fully contemplated.

What is claimed is:

1. In a plastic injection molding machine, having an injection cylinder and a reciprocable injection ram arranged therewithin, the improvement comprising:

means effecting reciprocation of said ram within said injection cylinder, said ram being otherwise not positively driven rotatively, and means supporting said ram for free rotation around its longitudinal axis and with respect to said injection cylinder;

a spiral ridge on the external surface of said ram terminating radially in close conformity with the internal wall of said injection cylinder;

whereby with each injection stroke, plastic material within the injection cylinder will be forced back against an adjacent portion of said spiral ridge and the reaction pressure of said plastic material against said ridge will effect a rotation of said ram about its longitudinal axis and such rotation will move plastic material entering between said ram and the surrounding cylinder wall along said ram and discharge it at the rearward end thereof.

2. In a plastic injection molding machine having an injection cylinder and a pressure fluid actuated ram cylinder, the improvement comprising:

a plunger and piston within said ram cylinder and rotatable with respect thereto;

an injection ram rotatably mounted within said injection cylinder and rigidly affixed to said plunger;

a spiral groove provided from one end to the other on the external surface of said injection ram, said groove providing a path for plastic material from its entrance at a point adjacent the plastic contacting end of said ram to its discharge at the opposite end of said ram;

whereby plastic material within the injection cylinder will enter into said groove and will exert a reaction pressure against the walls thereof to effect rotation of said ram about its longitudinal axis and said rotation will in turn move such last-named plastic material through said groove and discharge same at said opposite end of said ram.

3. In a plastic injection molding machine having an injection cylinder, the improvement comprising:

a ram cylinder having a reciprocable piston and a plunger, supply of fluid pressure to said ram cylinder effecting longitudinal movement of said plunger therein;

an injection ram reciprocable within said injection cylinder and means supporting said injection ram for free rotation with respect to said injection cylinder;

means including rotation permitting coupling means connecting said ram and plunger so that longitudinal movement of said plunger effects a corresponding longitudinal movement of said ram within said injection cylinder;

said ram having a spiral groove on the external surface of said ram extending from one longitudinal end substantially to the opposite end thereof, said opposite end of said groove being open to the atmosphere;

whereby a portion of the plastic material being injected into a mold will in a given cycle of operation enter into said groove and will exert a reaction pressure against the walls thereof to effect rotation of said ram about its longitudinal axis and such rotation will in turn move any plastic material which has entered into said groove in a previous cycle of operation through said groove and eventually discharge same from said opposite end thereof.

4. In a plastic injection molding machine, the combination comprising:

an injection cylinder having an injection opening and a feed opening spaced axially from said injection opening;

means for supplying plastic material to said cylinder through said feed opening;

an injection ram reciprocably arranged within said cylinder and means for moving said ram from a retracted position wherein the leading end thereof is on the opposite side of said feed opening from said injection opening to an advanced position wherein said leading end is located between said feed and said injection openings;

means supporting said ram for free rotation within said cylinder;

a spiral thread extending radially from said ram and extending closely adjacent the internal wall of the cylinder througout at least most of the length of said ram whereby when said ram is moved toward said advanced position, the ram will be rotated by the reaction force exerted thereon by the plastic material in said cylinder in such direction that the thread will forward a small part of the plastic material away from the injection opening and between said ram and said cylinder.

5. An injection molding machine according to claim 4, in which said means for supplying plastic material to said cylinder comprises a preplasticizing unit for feeding substantially fully plasticized material into said cylinder;

said cylinder being unobstructed between said feed opening and said injection opening so that the plasticized condition of the material is not substantially changed when it is within said cylinder.

6. An injection molding machine according to claim 4, including a resiliently backed finger mounted on said injection cylinder and projecting into said groove for assisting rotation of said ram when said ram is being advanced within said injection cylinder, said finger being ineffective when said ram is being moved to its retracted position.

References Cited in the file of this patent
UNITED STATES PATENTS

| | | |
|---|---|---|
| 2,243,968 | Lester | June 3, 1941 |
| 2,302,873 | Lester | Nov. 24, 1942 |
| 2,501,595 | Bohannon | Mar. 21, 1950 |
| 2,860,375 | Maccaferri | Nov. 18, 1958 |
| 2,890,491 | Hendry | June 16, 1959 |
| 2,899,710 | Hendry | Aug. 18, 1959 |
| 2,903,747 | Wucher | Sept. 15, 1959 |